US008997733B2

(12) United States Patent
McLean

(10) Patent No.: US 8,997,733 B2
(45) Date of Patent: Apr. 7, 2015

(54) ECOLOGICAL AND ERGONOMIC KETTLE

(76) Inventor: Iain Alan McLean, Preston (GB)

( * ) Notice: Subject to any disclaimer, the term of this patent is extended or adjusted under 35 U.S.C. 154(b) by 0 days.

(21) Appl. No.: 14/236,114

(22) PCT Filed: Jul. 18, 2012

(86) PCT No.: PCT/GB2012/051705
§ 371 (c)(1),
(2), (4) Date: Feb. 7, 2014

(87) PCT Pub. No.: WO2013/017829
PCT Pub. Date: Feb. 7, 2013

(65) Prior Publication Data
US 2014/0190466 A1 Jul. 10, 2014

(30) Foreign Application Priority Data

Aug. 2, 2011 (GB) .................................. 1113233.9
Jun. 6, 2012 (GB) .................................. 1209892.7

(51) Int. Cl.
*A47J 27/21* (2006.01)

(52) U.S. Cl.
CPC .................................. *A47J 27/21166* (2013.01)

(58) Field of Classification Search
CPC ...................... A47J 27/21166; A47J 27/21041;
A47J 27/2105; A47J 7/21183; A47J 31/103;
A47J 31/402
USPC .............. 222/133, 204, 205, 416; 126/380.1, 126/345, 349
See application file for complete search history.

(56) References Cited

U.S. PATENT DOCUMENTS

| | | | | | |
|---|---|---|---|---|---|
| 419,965 | A | * | 1/1890 | Mattison | 126/380.1 |
| 3,692,242 | A | * | 9/1972 | Wayfield | 239/265.19 |
| 3,859,902 | A | * | 1/1975 | Neumann et al. | 99/304 |
| 4,029,290 | A | * | 6/1977 | Karpenko | 251/82 |
| 4,527,467 | A | * | 7/1985 | Siemensma | 99/279 |
| 4,910,812 | A | * | 3/1990 | Comparetti | 4/325 |
| 5,025,714 | A | * | 6/1991 | Brewer | 99/300 |
| 5,028,753 | A | * | 7/1991 | Shariat | 219/689 |
| 5,049,713 | A | * | 9/1991 | Creyaufmuller | 219/689 |
| 5,168,794 | A | * | 12/1992 | Glucksman | 99/295 |
| 6,250,208 | B1 | * | 6/2001 | Helps et al. | 99/299 |
| 8,091,257 | B2 | * | 1/2012 | Aiura | 38/77.7 |
| 2004/0178131 | A1 | * | 9/2004 | Monteiro | 210/184 |
| 2008/0121110 | A1 | * | 5/2008 | Lee | 99/288 |

FOREIGN PATENT DOCUMENTS

| | | | |
|---|---|---|---|
| GB | 2460100 A | * | 11/2009 |
| WO | 01/93733 A1 | | 12/2001 |
| WO | WO 0193733 A1 | * | 12/2001 |
| WO | 2008/139173 A2 | | 11/2008 |
| WO | WO 2008139173 A2 | * | 11/2008 |
| WO | 2009/138736 A2 | | 11/2009 |

* cited by examiner

*Primary Examiner* — Dana Ross
*Assistant Examiner* — John J Norton
(74) *Attorney, Agent, or Firm* — Stuart I. Smith; Prass LLLP

(57) ABSTRACT

A kettle includes a water receiving chamber; a water heating chamber; and a water transfer siphon. The water transfer siphon has a siphon inlet aperture in communication with the water receiving chamber, and a siphon outlet aperture in communication with the water heating chamber. The water transfer siphon is preventable from priming with water from the water receiving chamber through a first rotation of the kettle to increase an elevation of a siphon crest of the water transfer siphon relative to a water level within the water receiving chamber, the first rotation occurring in a first direction.

20 Claims, 16 Drawing Sheets

ECOLOGICAL AND ERGONOMIC KETTLE

FIELD OF THE INVENTION

The present invention relates to liquid heating vessels, and particularly but not exclusively to electric water heating vessels such as kettles and the like.

BACKGROUND TO THE INVENTION

Electric water heating kettles have high power ratings and are in frequent use in many domestic settings, therefore accounting for a significant proportion of the electrical energy consumed by the household. Unfortunately, a great deal of the energy consumed by electric water heating kettles is wasted due to the user heating more water than was actually required—the excessive amount of water being used being due to the inconvenience of metering the correct amount of water. The amount of energy wasted can be very significant, with an average potential saving of around 30% versus what would be required if the desired amount of water was actually boiled.

There have been numerous recent attempts to provide a kettle that allowed the user to boil only the water they actually need to boil, most of those attempts being variations about a single concept: viz. a kettle with a high capacity water reservoir as separate from a water heating chamber—a valve system allowing transfer of a portion of the water in the water reservoir to the heating chamber, the water reservoir being filled at a low frequency relative to the frequency of boiling. These types of kettles have numerous problems. One problem is that they are generally heavy, another is that their dynamics are hard to predict due to the centre of gravity having a significant range of movement, another is that they are generally large making them difficult to charge, another is that many users prefer to use 'fresh' water rather than water that may have been stored for some period of time—and another is that parasitic losses from water heating chamber to water reservoir are difficult to avoid.

Kettles of this type replace one problem with many more problems and do not provide the convenience that is actually demanded by the market. What is required is a kettle that is as convenient to charge accurately as current/prior art kettles are to charge inaccurately.

Exemplary embodiments of the present invention provide a kettle that is even easier to charge accurately than prior art kettles are to charge inaccurately.

SUMMARY OF THE INVENTION

According to the present invention there is provided an apparatus and method as set forth in the appended claims. Other features of the invention will be apparent from the dependent claims, and the description which follows.

A first aspect provides a kettle, comprising: a water receiving chamber, a water heating chamber and a water transfer siphon, said water transfer siphon comprising a siphon inlet aperture in communication with the water receiving chamber and a siphon outlet aperture in communication with the water heating chamber, wherein the water transfer siphon may be preventable from priming with water from the water receiving chamber through a rotation of the kettle to increase the elevation of a siphon crest of the water transfer siphon relative to a water level within the water receiving chamber, said rotation occurring in a first direction.

Suitably, the water transfer siphon may be primeable with water from the water receiving chamber through a rotation of the kettle to decrease the elevation of the siphon crest of the water transfer siphon relative to a water level within the water receiving chamber, said rotation occurring in a second direction.

Suitably, the first direction is a rotation about a substantially horizontal axis towards a spout of the kettle and the second direction is a rotation about a substantially horizontal axis away from the spout and towards a handle of the kettle.

Suitably, the water receiving chamber further comprises a water receiving chamber bleed aperture formed within the lowermost portions of the water receiving chamber, the water receiving chamber bleed aperture communicating the water receiving chamber to the water heating chamber and being of a low water transfer rate capacity in comparison to the water transfer siphon.

Suitably, the water receiving chamber bleed aperture feeds directly into a vertically elongate slot, or is partly formed by a vertically elongate slot.

Suitably, the smallest cross sectional area of the water receiving chamber bleed aperture does not exceed substantially 4 square millimeters.

Suitably, the water transfer siphon is preventable from priming during water receiving chamber charging operations through a submergence of the siphon outlet aperture within a pool vessel arranged around the siphon outlet aperture, the pool vessel being chargeable with a bleed flow sourced from the water receiving chamber bleed aperture during water receiving chamber charging operations, the pool vessel being of a low volume relative to the water receiving chamber.

Suitably, the volume of the pool vessel is less than necessary to contain enough water to submerge the siphon outlet aperture when the kettle is oriented at a resting or heating orientation.

Suitably, the water transfer siphon is preventable from priming for a desired quantity of water within the water receiving chamber of the kettle through a mechanical means for temporarily and substantially obstructing a portion of the water transfer siphon.

Suitably, the mechanical means for temporarily and substantially obstructing a portion of the water transfer siphon comprises a gate disposed proximal the siphon inlet or outlet apertures, the gate being movable by user actuation between an open position allowing flow through said siphon apertures and a closed position substantially blocking flow through said siphon apertures.

Suitably, the mechanical means for temporarily and substantially obstructing a portion of the water transfer siphon comprises a valve arranged proximal to the siphon inlet or outlet apertures and acting to selectively block or unblock said siphon apertures, wherein the valve rotates between an open position allowing flow through said siphon apertures and a closed position substantially preventing flow through said siphon outlet apertures, the valve being movable between said positions through a rotation of the kettle.

Suitably, the mechanical means for temporarily and substantially obstructing a portion of the water transfer siphon comprises the user actuation of a gate that may close and open the only outlet of a low volume receiving vessel fed by the siphon outlet aperture, the low volume receiving vessel being the only immediate recipient of water flow from the siphon outlet aperture.

Suitably, the water receiving chamber further comprises water level markings arranged to measure a water level within the water receiving chamber for the kettle whilst not vertical and at a water charging angle at the time.

Suitably, the water receiving chamber is upwardly open save for the coverage provided by a splash guard, wherein the portion of the water receiving chamber not covered by the splash guard forms a water charging aperture through which the water receiving chamber may be charged with water.

Suitably, the splash guard is arranged to cover those portions proximal to the handle of the kettle, but not to cover those portions proximal to the spout of the kettle.

Suitably, a portion of the water transfer siphon is formed within the splash guard.

Suitably, the splash guard further comprises a user adjustable siphon flow regulator means extending into a portion of the water transfer siphon.

Suitably, at least a portion of the splash guard is formed of a substantially transparent, translucent or see-through material.

Suitably, the splash guard is detachable from the water receiving chamber.

Suitably, the splash guard further comprises a flap pivotally attached to the splash guard and arranged to selectively allow coverage of the water charging aperture.

Suitably, the water transfer siphon comprises an assembly of a siphon inner pipe and a siphon outer pipe concentric with the siphon inner pipe, wherein a gap between the siphon inner pipe and the siphon outer pipe comprises a siphon upwards channel and a passage through the siphon inner pipe comprises a siphon downwards channel.

Suitably, the user adjustable siphon flow regulator means comprises a user adjustable screw extending into the uppermost portions of the siphon inner pipe, the user adjustable screw being of a tapered, conical or frusto-conical shape where said extension occurs, the depth of extension being user variable through a rotation of the user adjustable screw Suitably the kettle further comprises a detachable power supply base.

Suitably, the water receiving chamber comprises a light source adapted to illuminate at least part of the interior of the water receiving chamber, the light source being automatically switchable between an 'on' state when the kettle is separated from the detachable power supply base, and an 'off' state when the kettle is located on the detachable power supply base.

Suitably, the kettle body is contoured such that some lower portions of the kettle body substantially underneath the spout are recessed and biased towards the handle side of the kettle, such that the kettle body, in profile, appears to overhang on the spout side.

Suitably, the water transfer siphon may be primeable and start-able through user actuation of a siphon priming mechanism, similar in principle to the siphon priming mechanism as may be found in a toilet cistern.

Suitably, the kettle further comprises any one or more of the group comprising: an electric heating element and/or a heat transfer plate thermally coupled to the interior of the water heating chamber, means for monitoring and/or controlling the temperature of the water within the water heating chamber; a sight-glass means for monitoring a water level within the water heating chamber; a thermostatic switch; a bimetallic strip; a steam tube; a steam-actuated whistle and a thermo chromic element.

Suitably, the water charging angle is an angle between substantially 15 degrees and substantially 30 degrees.

A second aspect provides a kettle, comprising: a kettle body and a water receiving chamber arranged within the upper portions of the kettle body; said water receiving chamber being upwardly open save for coverage providable by a splash guard means; said splash guard means being arranged to cover those portions of the water receiving chamber proximal to a handle of the kettle but not to those portions proximal to a spout of the kettle, a water charging aperture being formed of those portions not covered; said water receiving chamber further comprising a water level indication means arranged to allow a water level therein to be measurable for a kettle tilted on a substantially horizontal axis towards the spout; said kettle body being contoured such that some lower portions of the kettle body substantially underneath the spout are recessed and biased towards the handle side of the kettle, such that the kettle body, in profile, appears to overhang on the spout side.

The illustrated exemplary embodiments of the invention present embodiments that balance complexity with ease of manufacture and function, though it may be apparent to anyone skilled in the art that there are other embodiments possible without departing from the scope of the invention. For example, the embodiments described herein show a water transfer siphon assembly comprising a siphon inner pipe part and a separable siphon outer pipe part though it may be apparent that the water transfer siphon could be of a unitary construction and therefore would not constitute a 'water transfer siphon assembly'—being just a 'water transfer siphon' in this case. However, the term 'water transfer siphon' may be taken to describe either a unitary construction water transfer siphon, or a water transfer siphon assembly. Another alternative embodiment comprises a water transfer siphon having a siphon apex disposed higher than the water levels associated with any desired quantity (for a kettle oriented at the resting or heating orientation), the water transfer siphon further comprising a user actuated siphon priming mechanism used to prime and start the siphon, said user actuated siphon priming mechanism preferably being similar in operation to a toilet flush mechanism. Furthermore, the exemplary embodiments described herein comprise a water transfer siphon arranged proximal to the handle of the kettle, wherein the first direction, therefore, is a rotation towards the spout and the second direction is a rotation away from the spout and towards the handle. However, it may be apparent to anyone skilled in the art that the water transfer siphon may be arranged proximal to (for example) the left side or right side of the kettle—and therefore the first direction would be a rotation away from the side the water transfer siphon was located on, and the second direction would be a rotation towards the side the water transfer siphon was located on. Furthermore, the exemplary embodiments describe herein comprise water transfer siphons of a substantially concentric pipe design, though it may apparent to those skilled in the art that the siphon may be formed in a more typical fashion to resemble a 'bent pipe' type siphon, with the upper bend forming the siphon crest. In some alternative embodiments, such a 'bent pipe' siphon design may be incorporated within portions of the substantially vertical wall of the water receiving chamber proximal to the handle. A 'bent pipe' siphon design may also be suitable for application as an array of siphons, wherein each siphon within the array may be operable as an individual entity, substantially functionally separate from its neighbours. Alternative embodiments comprising a plurality of siphons may have lower failure rates in terms of siphon priming and subsequent water transference, in that a greater chance may exist that at least one of the siphons in the array successfully primes when other siphons in array do not—thus ensuring complete, though less rapid, transference of water from the water receiving chamber to the water heating chamber.

BRIEF DESCRIPTION OF THE DRAWINGS

The above mentioned and other features, aspects and advantages of exemplary embodiments of the present invention are described in greater detail below with reference to the accompanying drawings, which are intended to illustrate but not to limit the present invention. The drawings contain 19 figures.

FIGS. 1, 3,4,5,6 & 7 are schematic sectioned views of a kettle in a first embodiment of the present invention, the sections being bisections of the kettle along an XZ plane.

FIG. 1 is a schematic sectioned view of the kettle of the first embodiment, wherein the kettle is in a resting or heating orientation.

FIG. 5 is a schematic sectioned view of the kettle of the first embodiment, wherein the kettle is tilted beyond the first desired quantity critical angle.

FIG. 6 is a schematic sectioned view of the kettle of the first embodiment, wherein the kettle is in the resting or heating orientation and is transferring water from a water receiving chamber through a water transfer siphon to a water heating chamber.

FIG. 7 is a schematic sectioned view of the kettle of the first embodiment, wherein a volume of water within the water heating chamber has reached boiling point.

FIGS. 9A & 9B are schematic sectioned views of a kettle in a third embodiment of the present invention, wherein FIG. 9A shows the kettle in a water charging orientation and FIG. 9B shows the kettle in a resting or heating orientation.

FIG. 11A shows the kettle having the user actuated valve in an open position and FIG. 11B shows the kettle having the user actuated valve in a closed position.

FIG. 12A shows the kettle in a resting or heating orientation and having the swing valve in an open position. FIG. 12B shows the kettle in a water charging orientation and having the swing valve in a closed position.

Figure 1:
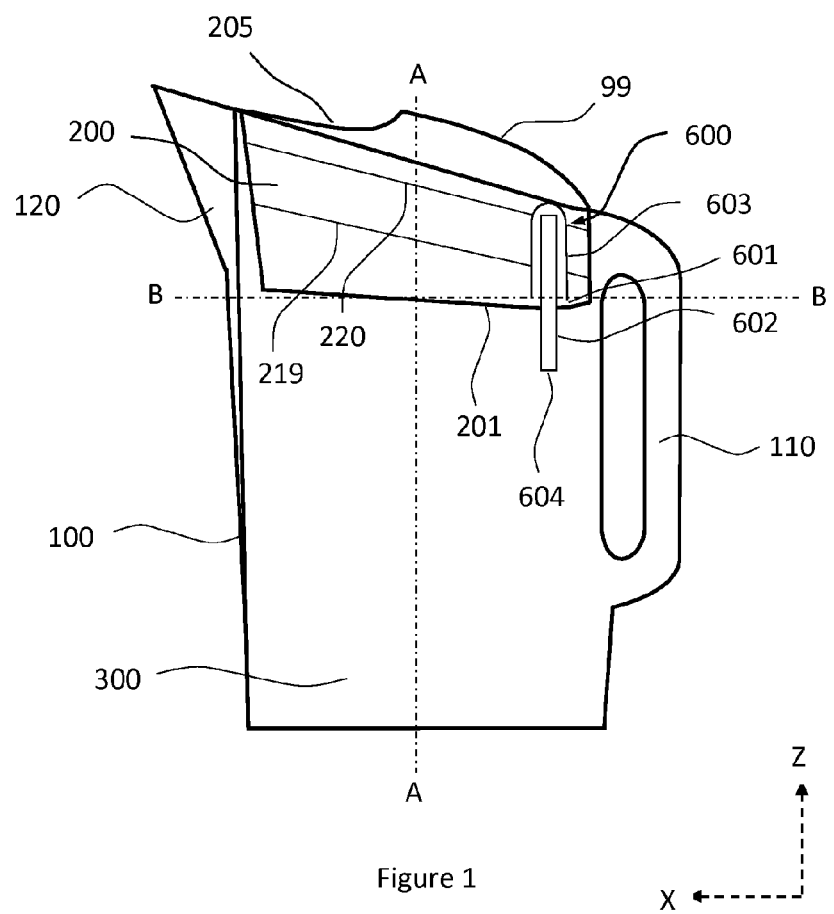

Each exemplary embodiment comprises an upwardly open kettle body comprising a water heating chamber formed therein, the base of the kettle body preferably comprising an electric heating element with associated electric connection and control equipment (for example: means for monitoring and/or controlling the temperature of the water may comprise a thermostatic switch, a bimetallic strip, a steam pipe, a steam-actuated whistle, a thermo chromic element). Prefer-ably, the electric heating element will reliably be able to boil small volumes of water without damage to the kettle—in some cases this volume may be as low as 200 ml. The electric heating element and associated electrical connection and control equipment are preferable but not shown in any of the schematic figures in order to preserve clarity for other parts. Additionally, each exemplary embodiment may comprise sight-glass means for monitoring a water level within the water heating chamber—this being another potential feature that does not appear on any of the figures in order to preserve clarity for other parts. Furthermore, each exemplary embodiment may preferably comprise a detachable power supply base though none of the figures show this potential feature for in order to preserve clarity for other parts.

DETAILED DESCRIPTION OF THE ILLUSTRATED EMBODIMENTS

In the following detailed description, terms such as 'X axis', 'Y axis' and 'Z axis' (vertical) may be used herein to clarify directions and orientations.

As used herein, the Z axis is defined as being parallel to the direction of gravitational force on earth, the X axis is defined as being orthogonal to the Z axis and running from the centreline of the handle side to the centreline of the spout side of the kettle. The Y axis is defined as being orthogonal to both the Z axis and Y axis.

As used herein, the phrase 'spout side' is defined as the substantially vertical portions of the kettle running in the negative Z direction down the Z axis from the spout and 'handle side' is defined as the substantially vertical portions of the kettle running from the upper portions of the handle in the negative Z direction down the Z axis towards the base floor of the kettle body and opposite the spout side.

As used herein, the phrase 'resting or heating orientation' is defined as the orientation of the kettle when a major axis of the kettle is substantially parallel to the Z axis and the kettle is substantially upright. Furthermore, the resting or heating orientation is an orientation where the kettle may be at rest or may be in the act of heating water.

As used herein, the term 'upper' is defined as portions of the part being described where those portions are generally greater in the positive Z direction, and the term 'lower' is defined as those portions of the part being described where those portions are generally greater in the negative Z direction.

As used herein, the phrase 'positive Z' is defined as the direction that is opposite to the direction of gravity and equivalent to 'up', whereas 'negative Z' is defined as the direction that is opposite to positive Z and equivalent to 'down'.

As used herein, the phrase 'positive X' is defined as the direction that is parallel to the X-axis and running from the handle side to the spout side, whereas 'negative X' is defined as the direction that is opposite to 'positive X'.

As used herein, the phrase 'positive Y' is defined as the direction 90 degrees clockwise of the positive X axis when looking down the Z axis (in the negative Z direction) and 'negative Y' is defined as the direction that is opposite to 'positive Y'.

As used herein the term 'level' is in relation to the Z axis. An increasing level is a level that is moving in a positive Z direction, and vice-versa. The term 'level' may also be used interchangeably with the term 'elevation'.

As used herein, the terms 'clockwise' and 'anti-clockwise' are to be interpreted within the context of the Figure that is being referred to.

As used herein, the phrase 'water charging orientation' is defined as the orientation of the kettle where the kettle is tilted about a substantially horizontal axis, such that a water charging angle (an acute angle) is formed between a major axis of the kettle and the Z axis and where the handle side of the kettle is greater in the positive Z direction relative to the spout side of the kettle than it would be if the kettle was in the resting or heating orientation. Furthermore, the water charging orientation is an orientation where the water receiving chamber of the kettle may be receiving water from, for example, a tap—and the quantity of water received may be measurable by the user whilst the kettle is in this orientation.

As used herein, the phrase 'water receiving chamber charging operations' is defined as comprising those operations required to charge the water receiving chamber of the kettle. Water receiving chamber charging operations begin on the placement of the kettle (oriented at a water charging orientation) proximal to a source of water (e.g. a tap) and end when a desired volume of water has been introduced to the water receiving chamber.

As used herein, the phrase 'first direction' when applied to a kettle in a first, second, third, fourth or fifth embodiment of the present invention is defined as a rotation of the kettle about a substantially horizontal axis towards the spout of the kettle.

As used herein, the phrase 'second direction' when applied to a kettle in a first, second, third, fourth or fifth embodiment of the present invention is defined as a rotation of the kettle about a substantially horizontal axis away from the spout and towards the handle of the kettle. A rotation in the second direction is a rotation in a substantially opposite direction to the rotation in the first direction.

As used herein, the phrase 'siphon crest' is defined as those portions of the water transfer siphon where water being transferred through the siphon would change from moving in a positive Z direction to moving in a negative Z direction.

As used herein, the phrase 'critical angle' is defined as the angle formed between the major axis of the kettle and the Z axis when the water level within the water receiving chamber is at, but not beyond the level of the siphon crest. Any further rotation in the second direction beyond the critical angle will lead to the water transfer siphon priming.

As used herein, the terms 'prime', 'priming' and 'primed', when used in context with a water transfer siphon, are defined as relating to the filling of the siphon with enough water, such that transfer of water by that water transfer siphon may begin.

As used herein, the phrase 'desired quantity' is defined as a quantity of water desired of the user to be introduced to the kettle for heating.

As used herein, the phrase 'first desired quantity' is defined as a quantity of water approximately equivalent to 250 ml.

As used herein, the phrase 'second desired quantity' is defined as a quantity of water approximately equivalent to 500 ml.

As used herein, the phrase 'first desired quantity critical angle' is defined as the critical angle associated with the first desired quantity within the water receiving chamber.

As used herein, the phrase 'second desired quantity critical angle' is defined as the critical angle associated with the second desired quantity within the water receiving chamber.

As used herein, the phrase 'water transfer operations' is defined as comprising those operations required to transfer a desired quantity of water from the water receiving chamber of the kettle to the water heating chamber of the kettle.

As used herein, the phrase 'water heating operations' is defined as the user instigated application of heat to the water in the water heating chamber of the kettle until such time that the water therein reaches a desired temperature, the kettle being in the resting or heating orientation at the time of heating.

As used herein, the phrase 'water dispensing operations' is defined as comprising those operations required to dispense a desired quantity of water from the kettle. Typically, water dispensing operations includes a tilting of the kettle about a substantially horizontal axis and in the first direction until water is emitted from the spout, and may include the removal of the kettle from the detachable power supply base prior to tilting.

FIG. 1 is a schematic sectioned view of the kettle of the first embodiment showing selected parts of the kettle, those selected parts including: a kettle body 100 comprising a water heating chamber 300, a handle 110 and a spout 120; a water receiving chamber 200; a splash guard 99; and a water transfer siphon assembly 600. The kettle body 100 is upwardly open rising from a base floor, the water heating chamber 300 being formed therein. The water heating chamber 300 is substantially closed off from above by the water receiving chamber 200 which is slidingly receivable within the upper portions of the kettle body 100. The water receiving chamber 200 is upwardly open and is preferably of a cross sectional area approaching the cross sectional area of the portion of the kettle body 100 it sits within, thereby maximising the volume it may contain for a given depth. The water receiving chamber 200 is at least partly covered by a splash guard 99 which covers, at least, those portions of the water receiving chamber 200 proximal to the handle 110 but does not cover those portions of the water receiving chamber 200 proximal to the spout 120. Those upwardly open portions of the water receiving chamber 200 not covered by the splash guard 99 forming a water charging aperture 205 through which the water receiving chamber 200 may be conveniently charged with water. The water charging aperture 205 is preferably of a greater cross sectional area to the cross sectional area of the spout 120. The water receiving chamber 200 comprises non-horizontal water level markings on internal walls, those water level markings being arranged on a tilted plane relative to the horizontal plane and preferably indicating a first desired quantity level 219 and a second desired quantity level 220. Alternative embodiments may provide water level markings to indicate different quantities. Additionally, users may choose to use water level markings for guidance only. Referring again to FIG. 1, the water receiving chamber 200 may be arranged to provide clearance for a steam tube for embodiments employing this method of control. The splash guard 99 is preferably detachable from the water receiving chamber 200 and at least partly formed of a substantially transparent, translucent or see-through material. The interface between the water receiving chamber 200 and the splash guard 99 may either be fully waterproof or substantially waterproof with provision for a channel to guide leaked water to the water heating chamber 300 of the kettle. In an alternative embodiment, part of the water transfer siphon assembly may be formed within the splash guard and may be substantially transparent, translucent or see-through. Referring again to FIG. 1, the water transfer siphon assembly 600 is detachably fixed to the water receiving chamber 200 and is of a concentric pipe design, comprising a siphon outer pipe 603 and a siphon inner pipe 602; the former part being a push fit onto the upper portions of the latter. The lowermost portions of the siphon outer pipe 603 (those portions of the siphon outer pipe 603 below the B-B line on the figure) do not reach a water receiving chamber base wall 201, the gaps then forming a siphon inlet aperture 601. The siphon inner pipe 602 is hollow and exits into the water heating chamber 300 through a siphon outlet aperture 604. The siphon outlet aperture 604 is disposed lower along the Z axis than the siphon inlet aperture 601. The water transfer siphon assembly 600 is arranged within those portions of the water receiving chamber 200 closest to the handle 110 and is detachable from the water receiving chamber 200 without use of tools for ease of disassembly and cleaning. The internal diameter of the siphon inner pipe 602 is chosen to provide a reasonable water transfer rate given the desire to keep the intrusion of the siphon inner pipe 602 into the water heating chamber 300 to a minimum. The siphon inner pipe 602 has a vertically elongate slot 605 formed onto those outer surface portions of the siphon inner pipe 602 closest to the water receiving chamber base wall 201. A water receiving chamber bleed aperture 235 is formed where the vertically elongate slot 605 formed on the siphon inner pipe 602 pierces the water receiving chamber base wall 201 (please see FIG. 10 for the vertically elongate slot 605). The water receiving chamber bleed aperture 235 is of a low transfer rate relative to the transfer rates that the water transfer siphon assembly 600 is capable of. Water contained and or heated within the water heating chamber 300 may be dispensed through the spout 120. The water orientation in the water receiving chamber 300 when the orientation of the kettle body 100 is as shown in FIG. 1 is referred to as the normal water level.

Figure 2:
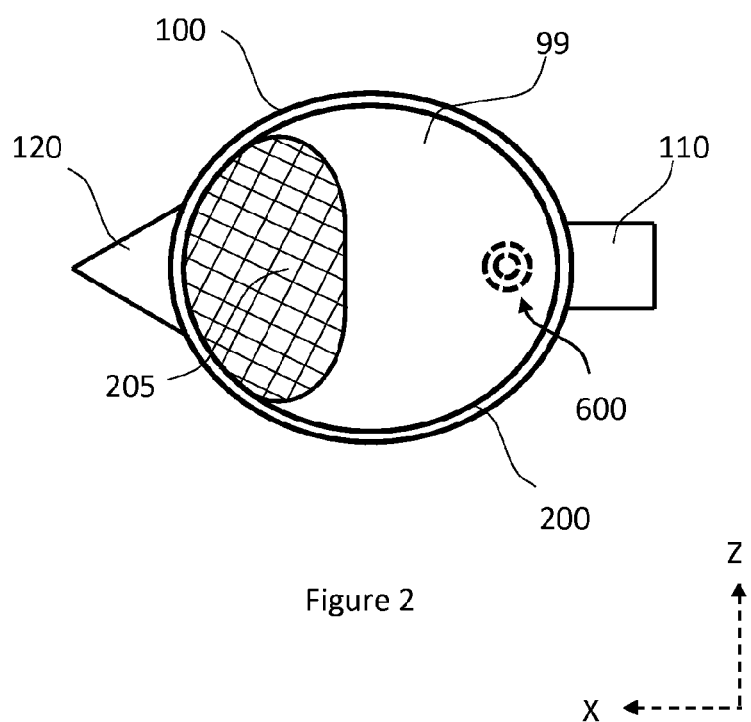
FIG. 2 is a schematic plan view of the kettle of the first embodiment, the cross hatched area depicting a water charging aperture of the kettle.

FIG. 2 is a schematic plan view of the kettle of the first embodiment showing the kettle body 100, the splash guard 99, the water receiving chamber 200, the water transfer assembly 600 and the water charging aperture 205 formed of the uncovered portions of the water receiving chamber 200 (the water charging aperture 205 is denoted by the cross hatched area on this figure). The water charging aperture 205 is preferably substantially larger in cross sectional area to the cross sectional area of the spout 120. The water charging aperture 205 is symmetric about the X axis for ease of filling within any sink, no matter which side of the sink is fitted with the tap. The figure also shows the splash guard 99 covering those portions of the water receiving chamber 200 proximal to the handle 110.

Figure 3A:
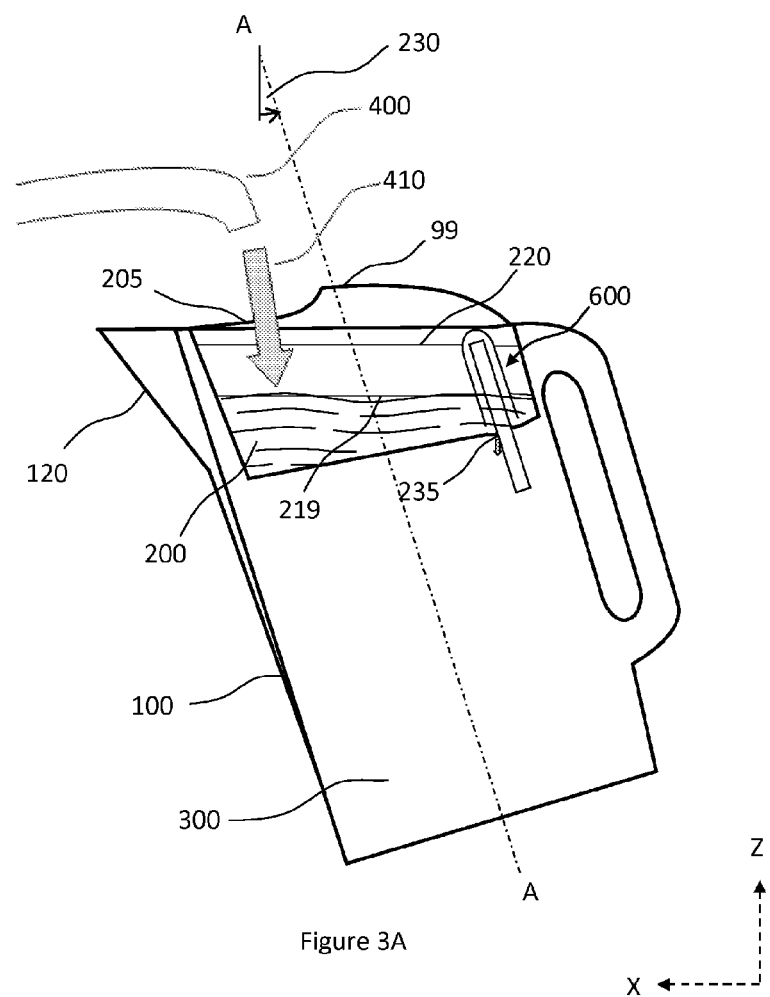
FIG. 3A is a schematic sectioned view of the kettle of the first embodiment, wherein the kettle is oriented at a water charging orientation during water receiving chamber charging operations.
Figure 3B:
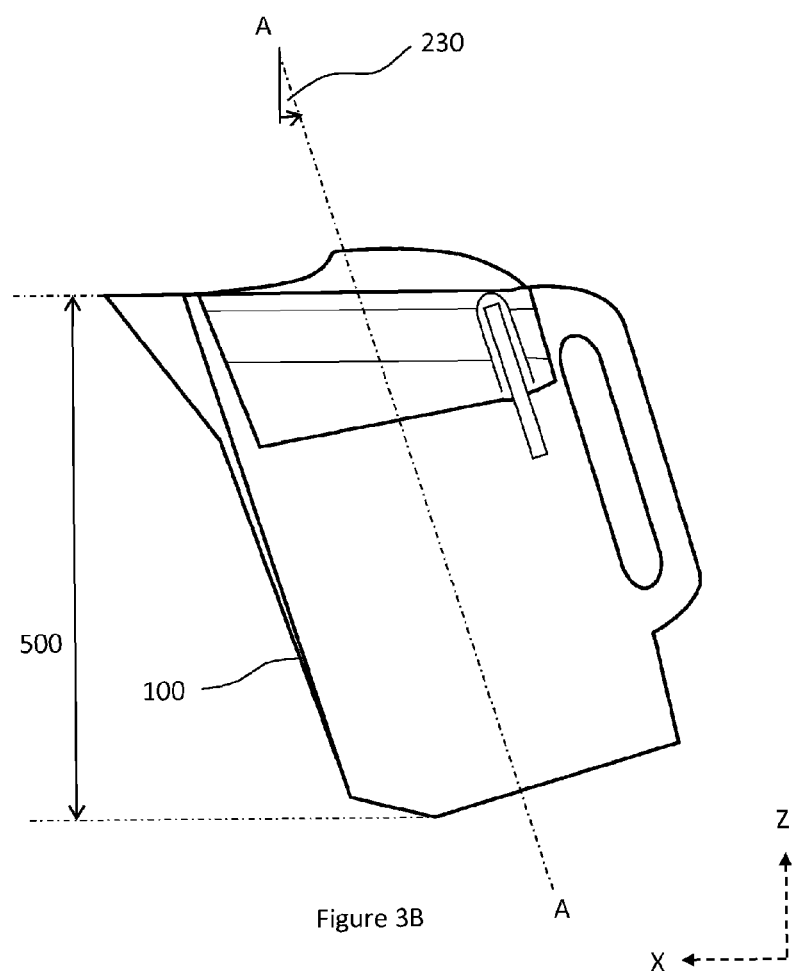
FIGS. 3B and 3C are schematic sectioned views of alternative embodiments, comprising kettle body shapes designed to reduce the Z axis clearance required during water receiving chamber charging operations.
Figure 3C:
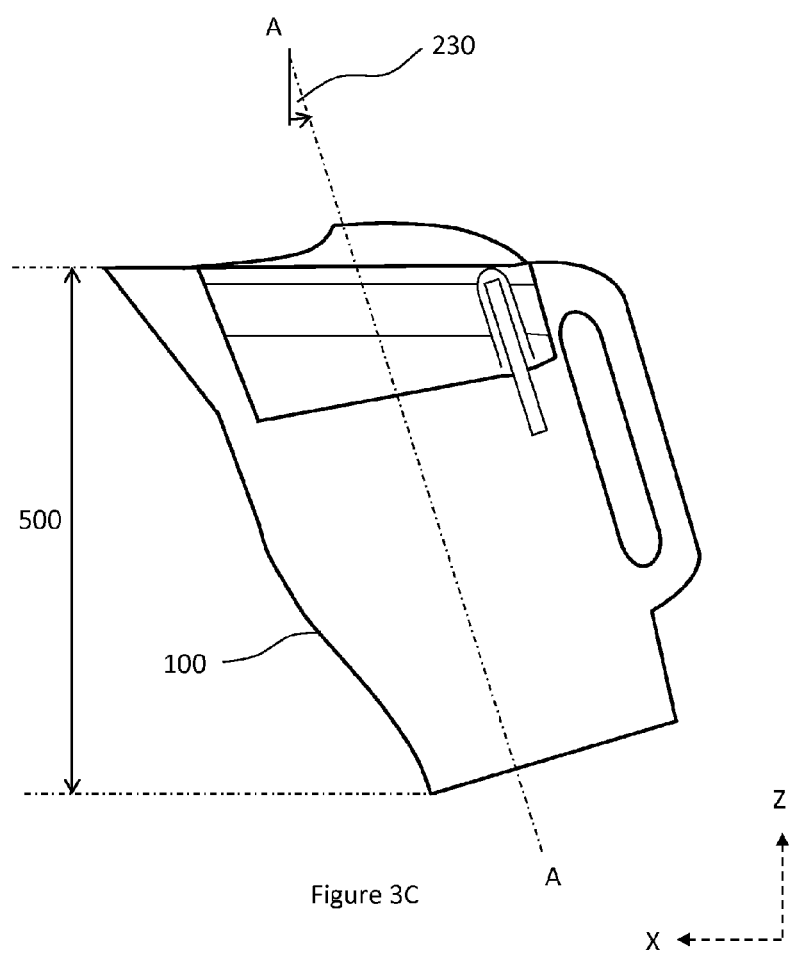

FIG. 3A is a schematic sectioned view of the kettle of the first embodiment oriented at a water charging orientation and when the water receiving chamber 200 is receiving water 410 from a tap 400, wherein a water charging angle 230 is formed between the Z axis and a major axis (A-A) of the kettle. The water level markings (first desired quantity level 219 and second desired quantity level 220) within the water receiving chamber 200 are on a substantially horizontal plane for the kettle oriented in this way and therefore may conveniently indicate a quantity within the water receiving chamber 200. The upper surfaces of the water receiving chamber 200 are preferably arranged on a substantially parallel plane to the plane of the water level markings (first desired quantity level 219 and second desired quantity level 220). Alternative embodiments may comprise a kettle body that is shaped to reduce the Z axis clearance required during water receiving chamber charging operations. For example, FIG. 3B and FIG. 3C show examples of contoured kettle body 100 shapes that could be employed to reduce the Z axis clearance 500 required for a kettle oriented at a water charging orientation—reducing the Z axis clearance required increases the ease with which the kettle may be placed within a sink for charging. Non vertical water charging orientations further improve the ease that a user may place an exemplary embodiment within a domestic sink, in that the clearance required directly underneath the tap is reduced—this location being the most likely location for dirty crockery, cups etc. Furthermore, charging any kettle at such an angle reduces the torque that a user has to provide and removes the need to force the kettle into an unergonomic/substantially upright orientation whilst at or close to arm's length. The combination of an ergonomic water charging angle, reduced Z axis clearance required and a large charging aperture (the water charging aperture 205) maximises the user's convenience during such time they are charging the kettle. Referring again to FIG. 3A, the water charging angle 230 is an angle in the first direction and beyond a first desired quantity critical angle (not shown on FIG. 3A) and a second desired quantity critical angle (not shown on FIG. 3A), ensuring that the water transfer siphon assembly 600 does not prime and start to transfer whilst the water receiving chamber 200 contains either the first desired quantity or the second desired quantity. Furthermore, the water receiving chamber bleed aperture 235 is of a sufficiently low transfer rate so as not to transfer substantial quantities of water from the water receiving chamber 200 to the water heating chamber 300 for durations typically required to charge the water receiving chamber 200. Accordingly, the user has time enough to accurately judge how much water has been introduced to the water receiving chamber 200. Typically, for many embodiments the water charging angle will be around 15-30 degrees, though other embodiments may comprise a range of water charging angles at higher angles—perhaps to aid filling from bathroom sinks (for example hotel kettle embodiments which might typically be filled from bathroom sinks). Referring again to FIG. 3A, the water level within the water receiving chamber 200 may be viewed by the user through the water charging aperture 205 and through the substantially transparent, translucent or see-through portions of the splash guard 99. Alternative embodiments may comprise some or all of the following group of features in order to improve the visibility of the water levels within the water receiving chamber during water receiving chamber charging operations: light emitting diode(s) automatically illuminating the inner surfaces of the water receiving chamber for such times the kettle is separate from the kettle's detachable power supply base; steps in the water receiving chamber walls acting as the water level markings; splash guards made from polarised transparent, translucent or see-through materials; a lens shaped splash guard magnifying some portion of the water receiving chamber; a water receiving chamber formed of a material with a low water affinity (causing light distortion at the edges of the water through beading, and thus greater clarity of said edge); water level markings of a colour highly attenuated by water; a minimal sized splash guard exposing significant portions of the water receiving chamber internal surfaces. Referring again to FIG. 3A, the kettle may be charged through the spout 120 for such times the kettle is required to heat greater quantities of water than may be contained within the water receiving chamber 200. The spout 120, therefore comprises a significantly large sized aperture such that filling by the spout 120 is convenient. Accordingly, all embodiments may comprise spouts with large apertures for this same reason. The kettle body 100, in common with all embodiments, may further comprise a traditional sight-glass (not shown) allowing a user to judge a water level within the water heating chamber 300.

Figure 4A:
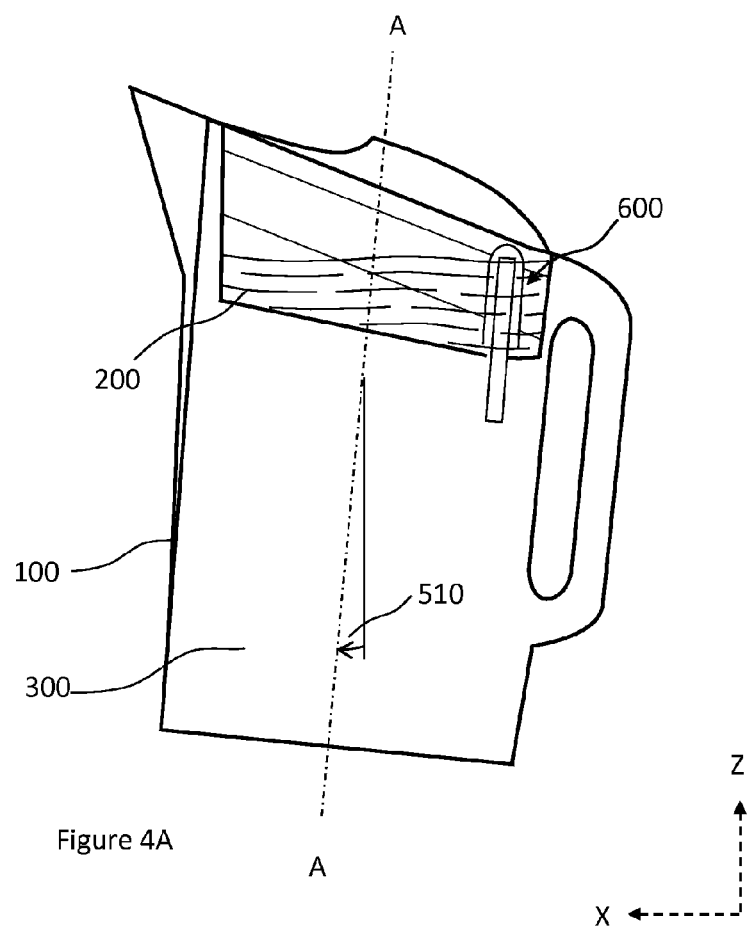
FIG. 4A is a schematic sectioned view of the kettle of the first embodiment, wherein the kettle is tilted to a first desired quantity critical angle

FIG. 4A is a schematic sectioned view of the kettle of the first embodiment tilted to the first desired quantity critical angle 510. The water level in the water receiving chamber 200 is almost high enough to prime the water transfer siphon assembly 600 and any further tilting in the second direction will lead to priming of the water transfer siphon assembly 600 and the subsequent instigation of transfer from the water receiving chamber 200 to the water heating chamber 300. For the first desired quantity of water in the water receiving chamber 200 the first desired quantity critical angle 510 is an angle clockwise beyond the resting or heating orientation.

Figure 4B:
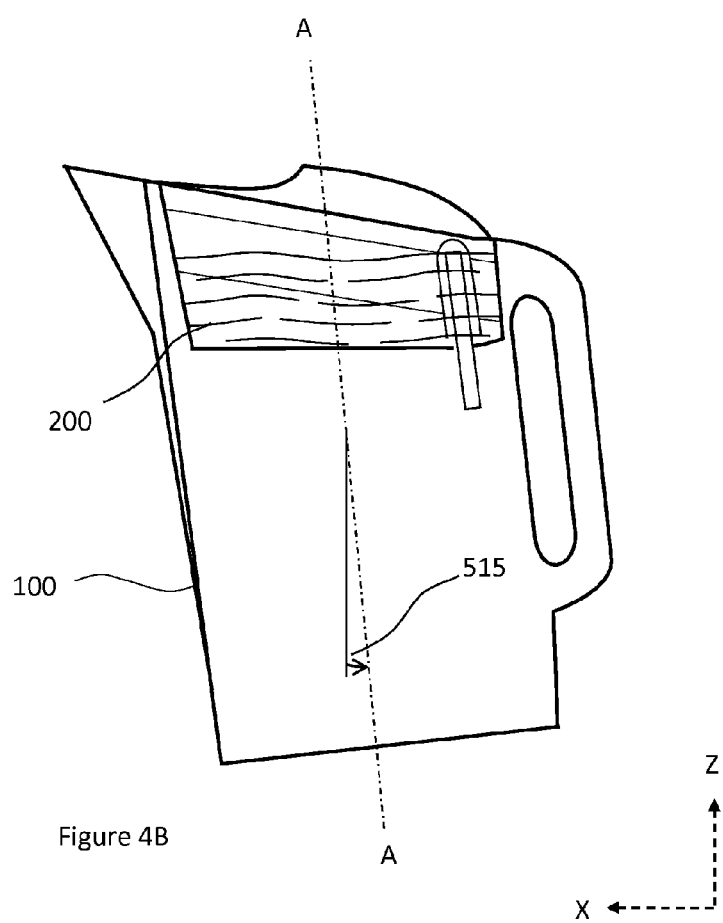
FIG. 4B is a schematic sectioned view of the kettle of the first embodiment, wherein the kettle is tilted to a second desired quantity critical angle.

As shown in FIG. 4B, for the second desired quantity of water in the water receiving chamber 200 the second desired quantity critical angle 515 is an angle between the major axis A-A and the Z axis for a kettle orientation somewhere between the water charging orientation and the resting or heating orientation. Each desired quantity has an associated critical angle, where greater desired quantities have critical angles closer to the water charging angle 230 (see FIG. 3A) than lesser quantities. The range of critical angles that an embodiment may comprise may be affected by a number of factors, including: water receiving chamber length along the X axis, the water charging orientation, the location of the siphon crest between the kettle handle and kettle spout and the height of the siphon crest along the Z axis for a kettle in the resting or heating orientation. For some alternative embodiments it may be preferable to arrange said factors to provide a range of critical angles for all desired quantities to be between the water charging angle and zero (zero being the angle associated with the resting or heating orientation), such that the act of returning the kettle to the resting or heating orientation after charging may be enough to instigate priming of the water transfer siphon. Some alternative embodiments may have the siphon crest disposed beyond the water receiving chamber and within a portion of the kettle handle in order to help provide just such a range of critical angles. Some alternative embodiments may have baffling around the water transfer siphon to help prevent inadvertent priming of the water transfer siphon through an uncontrolled movement of the water mass within the water receiving chamber.

Figure 5:
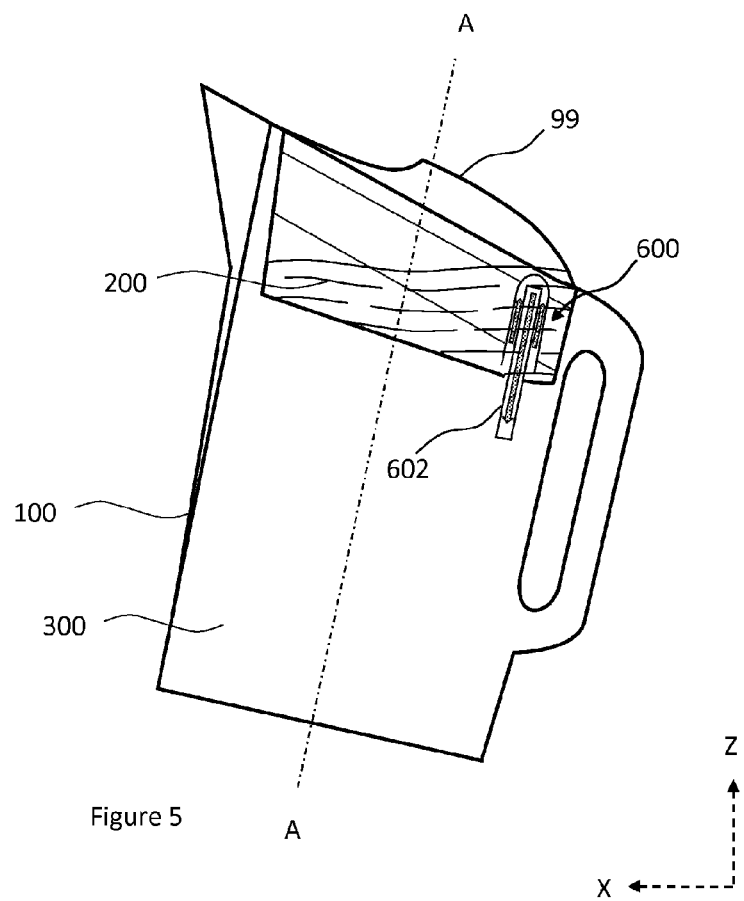

FIG. 5 is a schematic sectioned view of the kettle of the first embodiment being tilted in the second direction, and beyond the resting or heating orientation. The kettle is also tilted beyond the first desired quantity critical angle 510 (see FIG. 4A) and accordingly the water transfer siphon assembly 600 primes and starts to transfer water from the water receiving chamber 200 to the water heating chamber 300. The splash guard 99 is arranged to comprise a volume usable by the water within the water receiving chamber 200 for the kettle in this orientation, allowing the water level to comfortably exceed the height of the siphon inner pipe 602 thereby ensuring adequate priming of the water transfer siphon assembly 600. In practice the user need only momentarily orientate the kettle in this way to ensure reliable priming of the water transfer siphon assembly 600. Alternative embodiments may comprise a substantially transparent, translucent or see-through splash guard having the siphon outer pipe formed within said splash guard, thereby allowing the user to view the water level as it exceeds the crest and primes the water transfer siphon. Referring again to the kettle of the first embodiment, the kettle need only be returned to the resting or heating orientation for such times the water receiving chamber 200 may contain the second desired quantity.

Figure 6:
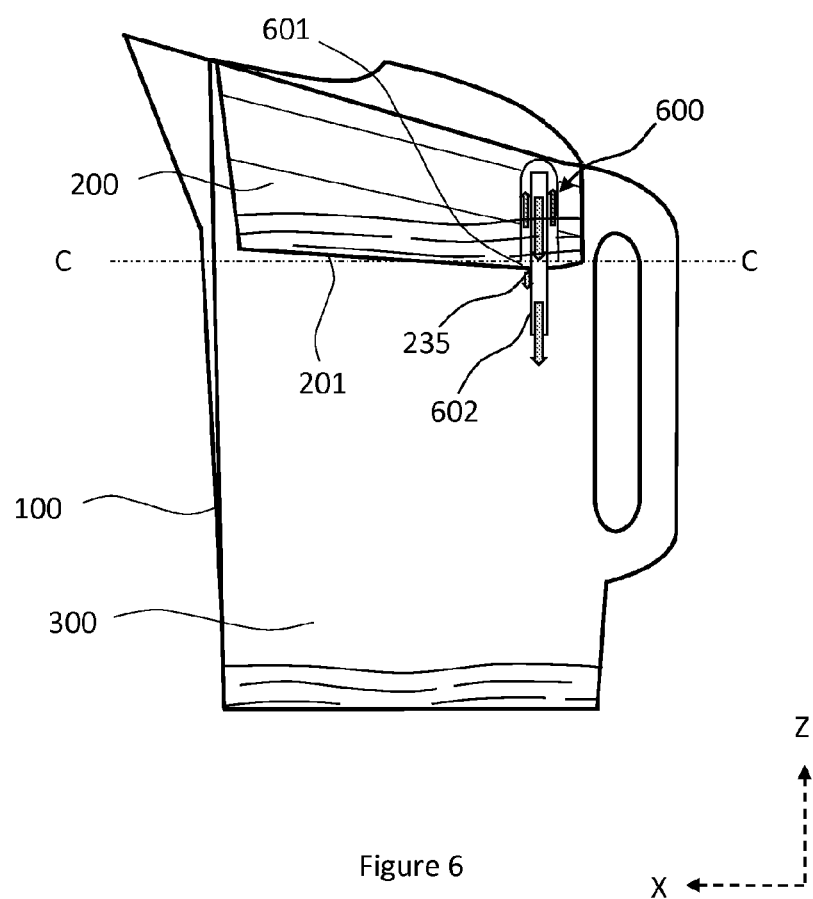

FIG. 6 is a schematic sectioned view of the kettle of the first embodiment oriented in the resting or heating orientation and transferring water from the water receiving chamber 200 to the water heating chamber 300 through the water transfer siphon assembly 600 after priming. A majority of the water contained within the water receiving chamber 200 will be transferred through the water transfer siphon assembly 600, this being aided in part by the inclination of the water receiving chamber base wall 201 sloping downwards to the siphon inlet aperture 601 such that the lowermost portions of the water receiving chamber 200 (those portions below the C-C line on FIG. 6) will be the last portions to be drained. Alternative embodiments may increase the proportion of the water transferable by the water transfer siphon through sifting of the siphon inlet aperture within a small recess in the lowermost portions of water receiving chamber. Referring again to FIG. 6, at the completion of transfer by the water transfer siphon assembly 600 a small volume of water may temporarily remain within the water receiving chamber 200, this being subsequently transferred through the water receiving chamber bleed aperture 235. The water receiving chamber bleed aperture 235 is preferably formed partly of a vertically elongate slot 605 (see FIG. 10) such that the volume of water that the vertically elongate slot 605 may contain will have a weight significantly greater than any forces produced by surface tension that may act to prevent transfer of water through the water receiving chamber bleed aperture 235. Accordingly the vertically elongate geometry will prevent surface tension of water from blocking up the water receiving chamber bleed aperture 235 for low hydraulic heads of water that may remain in the water receiving chamber 200. The internal cross sectional area of the water receiving chamber bleed aperture 235 is small in comparison to the internal diameter of the siphon inner pipe 602 such that the flow rates through the water receiving chamber bleed aperture 235 are insignificant in comparison to the flow rates that are possible through the water transfer siphon assembly 600—the size of the water receiving chamber bleed aperture 235 being big enough to transfer the remaining water before boiling may occur, but being small enough so as not to transfer a significant amount of water during water receiving chamber charging operations and small enough so as not to provide a substantial and unnecessary outlet for steam during boiling. Transfer of a significant amount of water during water receiving chamber charging operations could adversely affect the accuracy of said water receiving chamber charging operations. Accordingly, and through testing, the minimum internal cross sectional area of the water receiving chamber bleed aperture 235 may typically be less than 4 square millimeters. As shown in detail on FIG. 10, the water receiving chamber bleed aperture 235 is formed from a vertically elongate slot 605 on the outer surface of those portions of the siphon inner pipe 602 proximal to the water receiving chamber base wall 201. Some alternative embodiments may have the water receiving chamber bleed aperture separate from the siphon inner pipe and formed within the water receiving chamber base wall.

Figure 7:
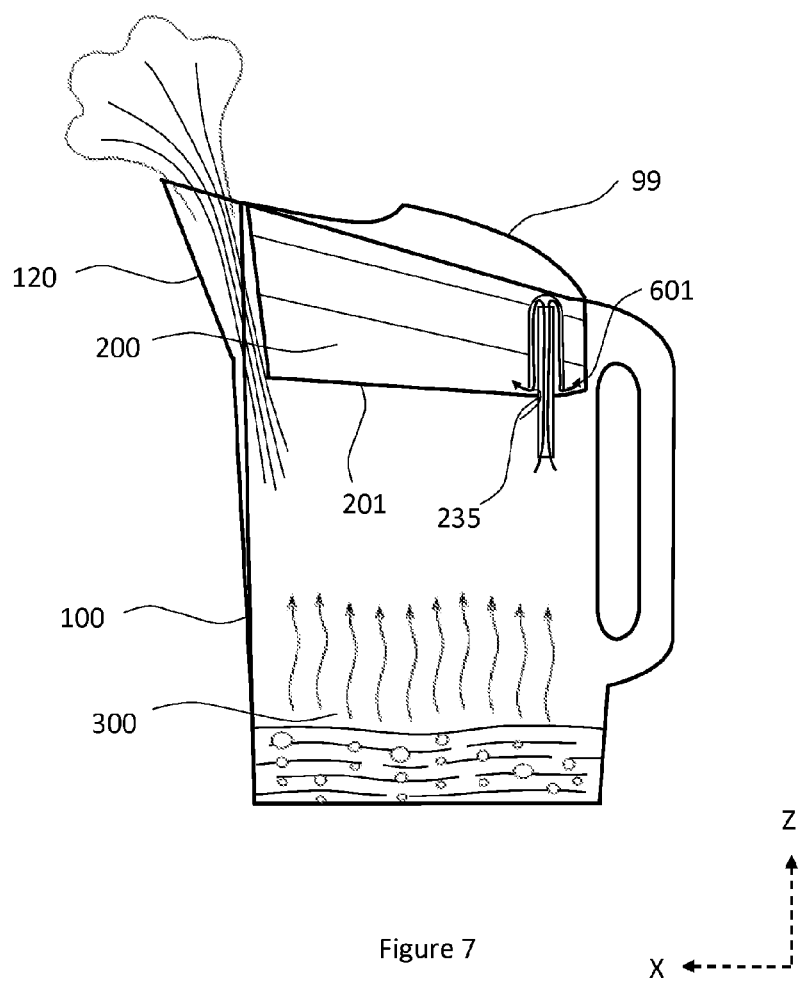

FIG. 7 is a schematic sectioned view of the kettle of the first embodiment showing the kettle during water heating operations and where a majority of the water in the water heating chamber 300 has reached boiling point due to application of heat from a heating element (not shown) in the base floor of the kettle body 100. The water receiving chamber base wall 201 is acting as a single skinned lid in the illustrated embodiment. The risk of scalding to the user is reduced through the recessed arrangement of the water receiving chamber base wall 201 and the coverage of the water receiving chamber 200 as provided by the splash guard 99. Alternative embodiments may employ further protective measures to reduce the temperatures that may be present on the water receiving chamber base wall—for example through the inclusion of extras skins of material between the water receiving chamber base wall and the water heating chamber. Referring again to FIG. 7, steam may exit the siphon inlet aperture 601 within the water receiving chamber 200, flowing backwards through the water transfer siphon assembly 600 in response to the positive pressure within the water heating chamber 300, though the quantity of steam is not significant in comparison to the quantity of steam that may exit the spout 120. Alternative embodiments may employ a water temporary retention vessel such as disclosed within GB patent application GB1206888.8 that may prevent the egress of steam through the water transfer siphon for such times the kettle has been charged via the water receiving chamber. Referring again to FIG. 7, the vertically elongate nature of the water receiving chamber bleed aperture 235 of the kettle of the first embodiment favours bleed flow from the water receiving chamber 200 to the water heating chamber 300 but discourages gas flow from the water heating chamber 300 into the water receiving chamber 200. Some alternative embodiments may not comprise any water receiving chamber bleed aperture, instead allowing the water not cleared by the water transfer siphon simply to be poured into a user's cup during water dispensing operations.

Figure 8A:
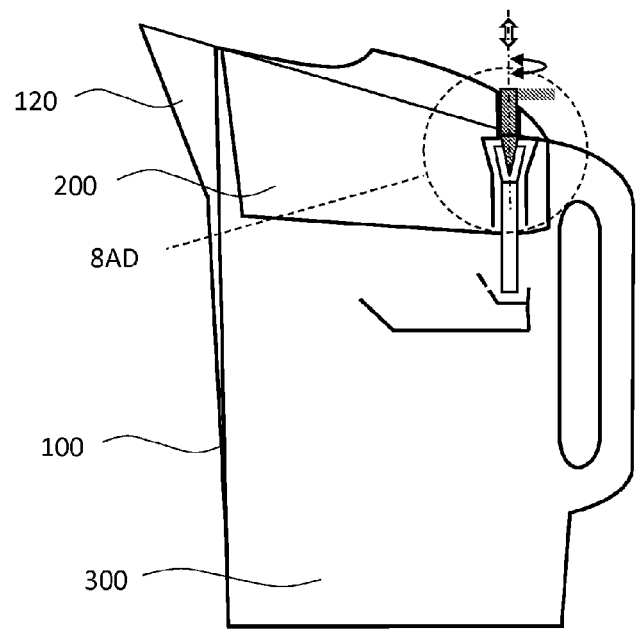
FIG. 8 is a schematic sectioned view of a kettle in a second embodiment of the present invention, wherein the kettle is in a resting or heating orientation.
Figure 8B:
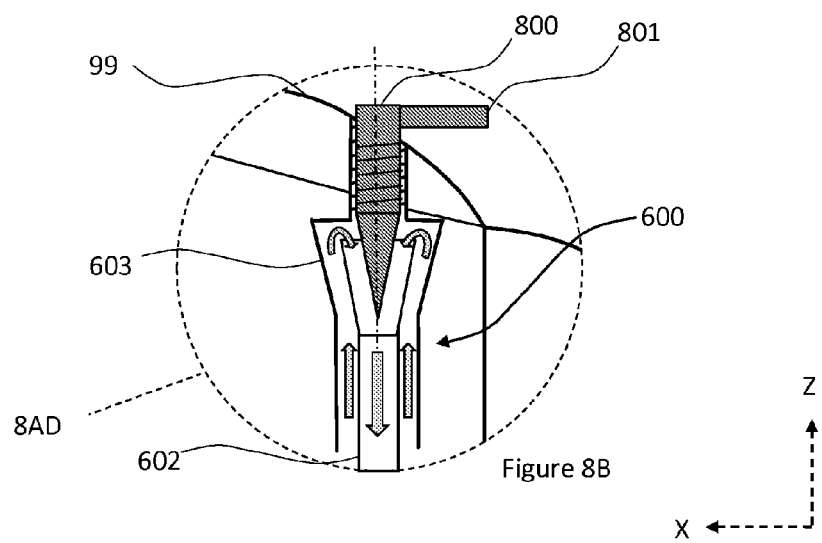

FIG. 8 is a schematic sectioned view of a kettle of a second embodiment comprising: a water receiving chamber 200, a water heating chamber 300 and a splash guard 99 having a siphon outlet pipe 603 formed as part of the splash guard 99 and thereby forming part of a water transfer siphon assembly 600. Also shown is a water transfer siphon assembly 600, a siphon inner pipe 602, a siphon outer pipe 603, a user adjustable screw 800 (concentric with both a siphon inner pipe 602 and the siphon outer pipe 603) and a user adjustable screw adjustment handle 801. The user adjustable screw 800 being arranged to pierce the splash guard 99 and penetrate the inlet portion of the siphon inner pipe 602, the portion of the user adjustable screw 800 penetrating the inlet portion of the siphon inner pipe 602 being substantially tapered, conical or frusto-conical. Adjustment of said penetration being through the combination of a male thread formed onto the outer portions of the user adjustable screw 800 being interfaced with a suitable female thread formed onto the inner diameter of those portions of the splash guard 99 pierced by the user adjustable screw 800, and rotation of the user adjustable screw 800 relative to the splash guard 99. Rotation of the user adjustable screw adjustment handle 801 in a clockwise direction increases the depth of penetration into the inlet of the siphon inner pipe 602 thereby reducing the flow rates that the water transfer siphon assembly 600 may be capable of. Rotation of the user adjustable screw adjustment handle 801 in an anti-clockwise direction decreases the depth of penetration into the inlet of the siphon inner pipe 602, thereby increasing the flow rates that the water transfer siphon assembly 600 may be capable of. Embodiments employing such a splash guard 99 comprising a user adjustable screw 800, in combination with a weir vessel and water temporary retention vessel as disclosed in GB patent application GB1206888.8 provide the user with the ability to vary the rates of transfer of the water transfer siphon assembly 600 and therefore the proportion of the water transferred to the water heating chamber 300 for heating for any given initial volume within the water receiving chamber 200. I.e. the weir vessel is capable of transferring water into the water heating chamber 300 at the same rate the weir vessel receives water, through small differences in the water level within the weir vessel during transfer, however the bleed aperture formed on the water temporary retention vessel may not significantly increase its flow rate into the water temporary retention vessel through the same increase in water level. The result being that having the water transfer siphon assembly 600 set to flow at a maximum rate diverts less water to the water temporary retention vessel than having the water transfer siphon assembly 600 set to flow at a minimum rate. Accordingly the user may vary the temperature resultant from the spout 120 after boiling through user selection of the quantity of water transferred to the water heating chamber 300 for heating versus the quantity of water diverted to the water temporary retention vessel. The user adjustable screw 800 shown on the figure represents just one example of a user adjustable siphon flow regulator means, it may be apparent to anyone skilled in the art that a great many alternative mechanisms of a similar nature may be employed, for example, mechanisms that adjustably constrict the flow at the outlet of the siphon.

Figure 9A:
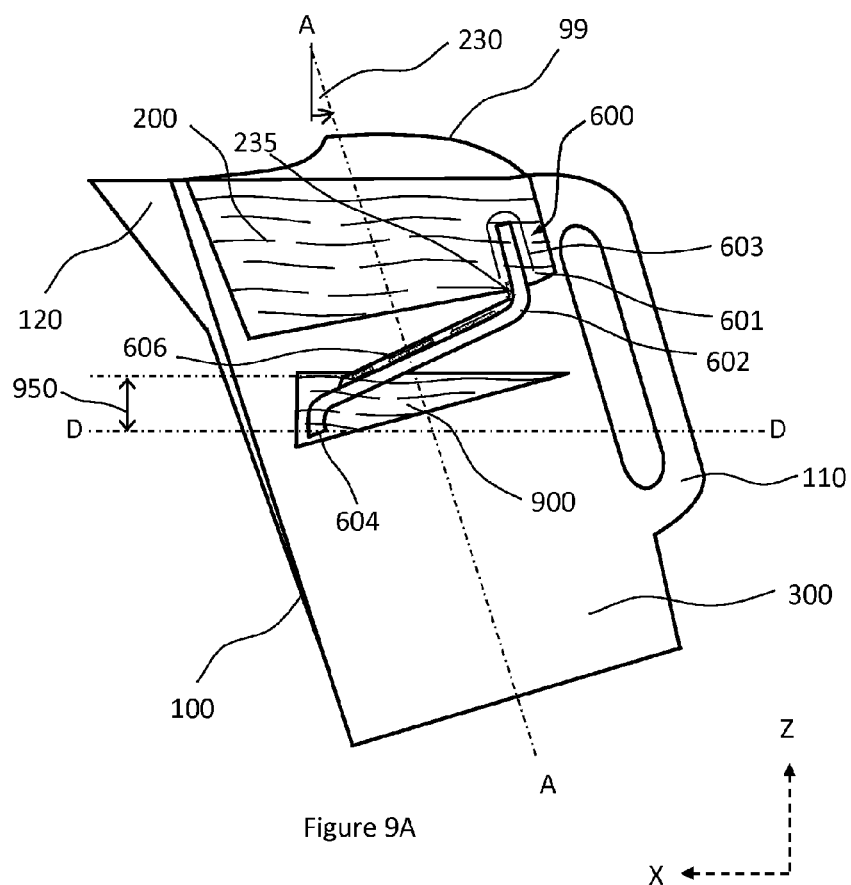

FIG. 9A is a schematic sectioned view of a kettle of a third embodiment oriented at a water charging orientation and showing selected parts of the kettle, those selected parts including a kettle body 100, a splash guard 99, a handle 110, a spout 120, a water receiving chamber 200, a water receiving chamber bleed aperture 235, a water transfer siphon assembly 600, a siphon bleed channel 606, a siphon inner pipe 602, a siphon outer pipe 603, a water heating chamber 300 and a pool vessel 900. A water charging angle 230 is formed between a major axis (A-A) of the kettle and the Z axis for the kettle in just such an orientation. The water transfer siphon assembly 600 further comprises a siphon inlet aperture 601 proximal to the handle side of the kettle and a siphon outlet aperture 604 proximal to the spout side of the kettle, the siphon inner pipe 602 running forwards and down from the water receiving chamber 200 towards the siphon outlet aperture 604. As the water receiving chamber 200 is charged during water receiving chamber charging operations the water level therein will quickly reach the water receiving chamber bleed aperture 235, in turn leading to a bleed flow from the water receiving chamber 200 running into the siphon bleed channel 606 formed on the upper surfaces of the siphon inner pipe 602. The bleed flow running down the siphon bleed channel 606 then runs into the pool vessel 900. The pool vessel 900 has minimal depth along the Y axis, ensuring a minimal volume and fills quickly from the bleed flow. In an alternative embodiment, the water receiving chamber bleed aperture is formed within those portions of the water receiving chamber base wall most likely to directly receive water from a tap. Having the water receiving chamber bleed aperture thus subject to elevated hydraulic pressures during charging increases the rate by which the pool vessel may be filled, with no increase required in terms of the cross sectional area of the water receiving chamber bleed aperture. Referring again to FIG. 9A, the pool vessel 900 is capable of containing water only whilst tilted in the first direction and may contain a maximum quantity of water for such times the kettle is oriented at the water charging orientation as shown. The siphon outlet aperture 604 is arranged to exit into the lowermost portions of the pool vessel 900 (those portions below the D-D line on FIG. 9A) and is therefore ultimately submerged within a depth of water shown by dimension 950. As the level in the water receiving chamber 200 rises yet further during water receiving chamber charging operations the air between the siphon inner pipe 602 and the siphon outer pipe 603 will get pushed into the siphon inner pipe 602, in turn leading to an ejection of a similar quantity of water or air from the siphon outlet aperture 604—causing a hydraulic head that resists the ejection of yet more water or air and therefore the further filling of the water transfer siphon assembly 600. The dimensions of the siphon inner pipe 602, the siphon outer pipe 603 and the pool vessel 900 are arranged such that the volume formed between the siphon outer pipe 603 and the siphon inner pipe 602 is equal to or greater than the maximum volume of water that may be contained within the siphon inner pipe 602 for such times the pool vessel 900 is full and the kettle is at the water charging orientation. Accordingly the full potential hydraulic head of pressure (as represented by dimension 950) capable of resisting further filling of the water transfer siphon assembly 600 may be achieved before the water level within the siphon outer pipe 603 has reached the very top of the siphon inner pipe 602. A rising rate of hydraulic head resisting the further filling of the water transfer siphon assembly 600 allows a user to charge the water receiving chamber 200 to a range of water levels above the level of the siphon outer pipe 603 with the confidence that significant water transfer will not occur whilst the kettle is oriented at the water charging orientation. The water receiving chamber bleed aperture 235 is sized to produce a bleed flow that will fill the small volume of the pool vessel 900 before the water level in the water receiving chamber 200 is likely to have risen significantly above the level of the siphon outer pipe 603.

Figure 9B:
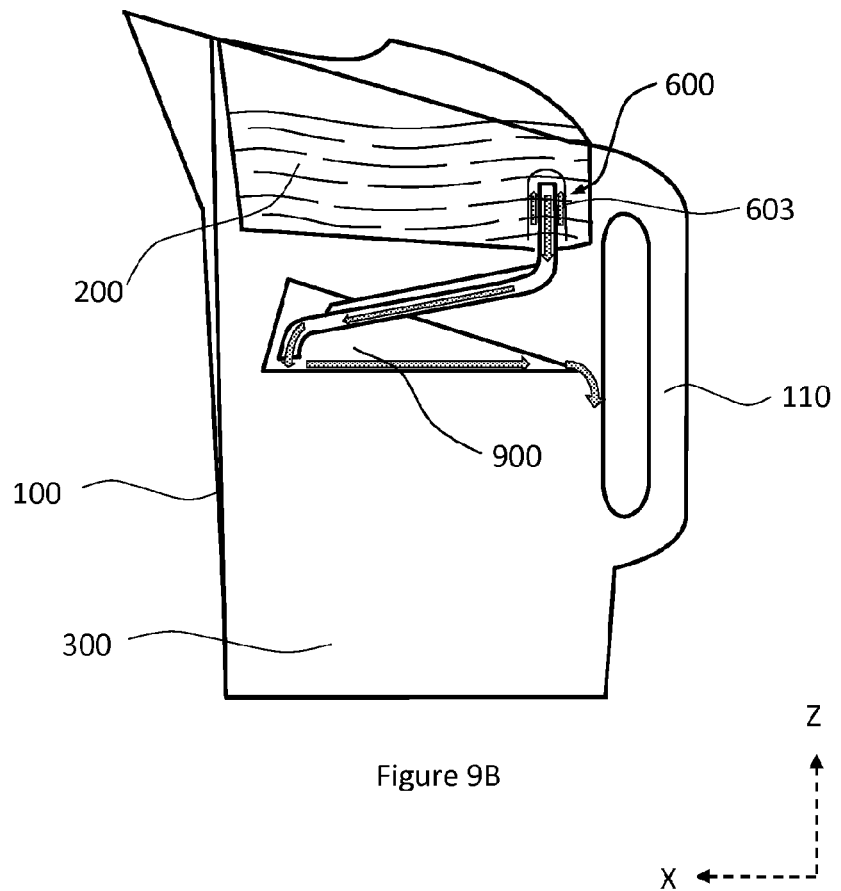

FIG. 9B is schematic sectioned view of the kettle of the third embodiment oriented at the resting or heating orientation. The pool vessel 900 is not capable of containing water whilst the kettle is in this orientation and therefore substantially empties on restoration of the kettle from the water charging orientation to the resting or heating orientation—removing any hydraulic head that may have been resisting the further filling of the water transfer siphon assembly 600. The water level within the water receiving chamber 200 simultaneously rises further above the siphon outer pipe 603, thereby increasing the hydraulic head favouring priming of the water transfer siphon assembly 600. The result is that water transfer siphon assembly 600 completes its priming and starts to transfer water. The water transfer siphon assembly 600 is arranged such that the first desired quantity of water will cover the siphon outer pipe 603 for the kettle restored to the resting or heating orientation. Accordingly, the critical angles associated with this embodiment are between the water charging angle 230 (See FIG. 9A) and zero and so the user need only ever return the kettle to the resting or heating orientation after charging in order to instigate the transfer of the water they have just introduced into the water receiving chamber 200.

Figure 10:
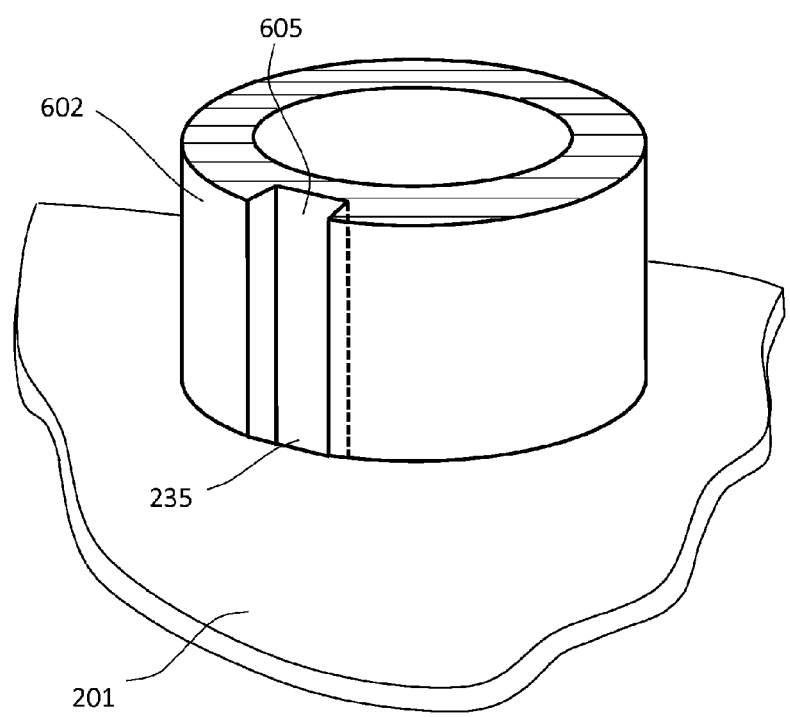
FIG. 10 is a schematic sectioned view of a portion of a water receiving chamber base wall having a siphon inner pipe penetrating a water receiving chamber base wall, and showing the arrangement of a water receiving chamber bleed aperture formed therein.

FIG. 10 is described within the detailed description of other figures.

Figure 11A:
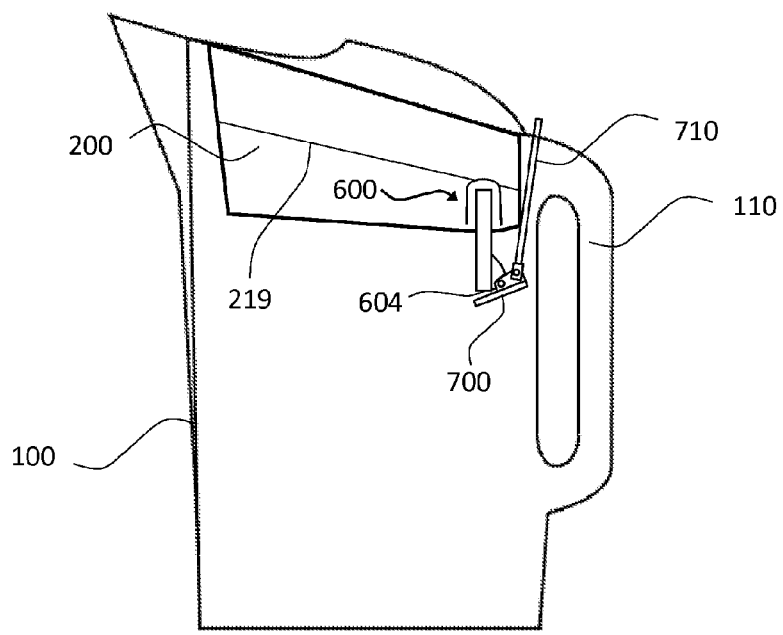
FIGS. 11A & 11B are schematic sectioned views of a kettle in a fourth embodiment of the present invention comprising a user actuated valve.

FIG. 11A is a schematic sectioned view of a kettle of a fourth embodiment showing selected parts of the kettle, those selected parts including: a kettle body 100, a handle 110, a water receiving chamber 200, a first desired quantity level 219, a water transfer siphon assembly 600 and a user actuated valve 700. The user actuated valve 700 is pivotally attached to the lower portions of the siphon inner pipe 602 and pivotally attached to a gate pushrod 710. The user actuated valve 700 is held in an open position (as is depicted in FIG. 11A) through tension on the gate pushrod 710 produced through force of a spring (not shown) arranged within an actuation button (not shown), said actuation button preferably being located at the top of the gate pushrod 710 and easily accessible to a user gripping the handle 110. In the open position, the user actuated valve 700 does not block the siphon outlet aperture 604.

Figure 11B:
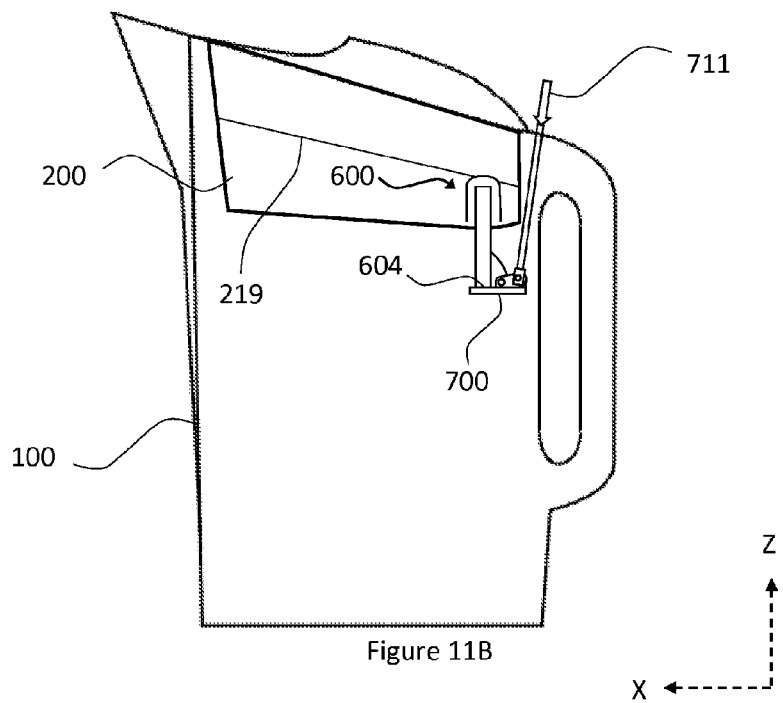

FIG. 11B is a schematic sectioned view of the kettle of the fourth embodiment, wherein a user has produced a force 711 on the gate pushrod 710, causing the user actuated valve 700 to rotate clockwise about the Y axis and consequently to block the siphon outlet aperture 604. Having the ability to block the siphon outlet aperture 604 allows the siphon inner pipe 602 to be arranged low enough within the water receiving chamber 200 such that it may be below the water level of the first desired quantity level 219 for the kettle oriented at a water charging orientation. Accordingly the kettle need only be returned to the resting or heating orientation and the force 711 removed to ensure that the water transfer siphon assembly 600 primes and transfers water from the water receiving chamber 200. The illustrated mechanism shown in FIGS. 11A & 11B is just one example of a mechanical means for temporarily and substantially obstructing a portion of the water transfer siphon assembly 600—and that may be conveniently actuated by the user when charging the kettle, that mechanism acting to block or impede the action of the water transfer siphon assembly 600. However, it may be apparent to anyone skilled in the art that a great many alternative mechanisms of a similar nature may be employed, for example mechanisms that block or impede flow at the inlet to the siphon, or mechanisms that block or impede flow the siphon crest.

Figure 12A:
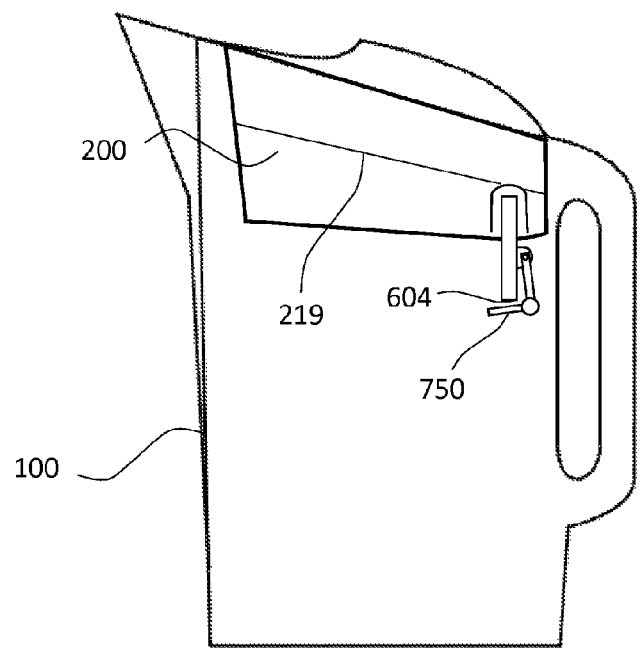
FIGS. 12A & 12B are schematic sectioned views of a kettle in a fifth embodiment of the present invention comprising a swing valve.

FIG. 12A is a schematic sectioned view of a kettle of a fifth embodiment showing selected parts of the kettle, those parts including: a kettle body 100, a water receiving chamber 200, a first desired quantity level 219, a water transfer siphon assembly 600 and a swing valve 750. The swing valve 750 is pivotally attached to a portion of the siphon inner pipe 602 underneath the water receiving chamber 200. The centre of mass of the swing valve 750 is arranged such that the swing valve 750 hangs slightly open for such times the kettle is oriented at the resting or heating orientation. In this position, the swing valve 750 does not block the siphon outlet aperture 604.

Figure 12B:
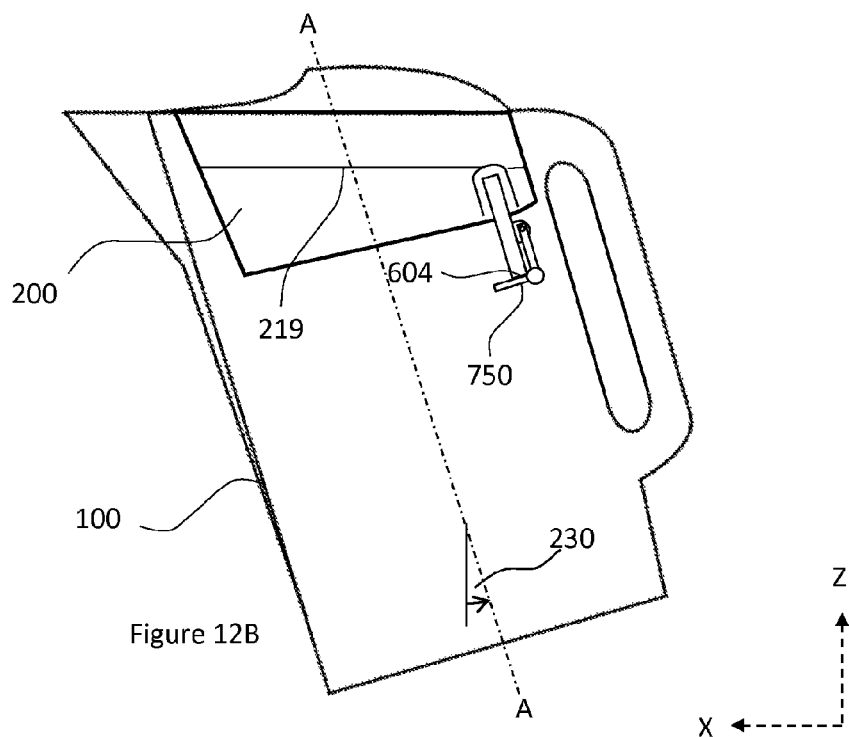

FIG. 12B is a schematic sectioned view of the kettle of the fifth embodiment, wherein the kettle is oriented at a water charging orientation and where a water charging angle 230 has formed between the Z axis and a major axis (A-A) of the kettle. The centre of mass of the swing valve 750 has moved to the right (in a negative X direction) of the pivot, causing the valve to swing clockwise to block the siphon outlet aperture 604. The portion of the swing valve 750 that covers the siphon outlet aperture 604 may comprise a greater surface area than the surface area of the siphon outlet aperture 604, this subsequently allowing water exiting the siphon outlet aperture 604 during water transfer operations to force the swing valve 750 further open (water transfer operations occurring typically after the kettle has been returned to the resting or heating orientation). Having the ability to automatically block the siphon outlet aperture 604 allows the siphon inner pipe 602 to be arranged low enough within the water receiving chamber 200 such that it may be below the first desired quantity level 219 for the kettle oriented at the water charging orientation. Accordingly the kettle need only be returned to the resting or heating orientation to ensure that the water transfer siphon assembly 600 primes and transfers water from the water receiving chamber 200. The illustrated mechanism shown in FIGS. 12A & 12B is just one example of an angle actuated mechanical means for temporarily and substantially obstructing a portion of the water transfer siphon—and that may conveniently and automatically block or impede the action of the water transfer siphon assembly 600 through a tilting of the kettle to the water charging orientation. However, it may be apparent to those skilled in the art that there are a great many alternative similar mechanisms possible—for example angle actuated mechanisms that may block or impede the inlet of the water transfer siphon assembly.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstracts and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A kettle, comprising:
   a spout;
   a handle;
   a water receiving chamber to receive water, a water level in the water receiving chamber when the kettle is in a resting orientation being referred to as a normal water level;
   a water heating chamber below the water receiving chamber; and
   a water transfer siphon, the water transfer siphon having
      a siphon inlet aperture in communication with the water receiving chamber, and
      a siphon outlet aperture in communication with the water heating chamber,
   wherein the water transfer siphon is preventable from priming with water from the water receiving chamber by a first tilting of the kettle by a user to increase an elevation of a siphon crest of the water transfer siphon relative to a water level within the water receiving chamber, the first tilting occurring in a first direction, the first direction being a rotation about a substantially horizontal axis towards the spout of the kettle,
   the water transfer siphon is primeable with water from the water receiving chamber by a second tilting of the kettle by the user to decrease the elevation of the siphon crest of the water transfer siphon relative to the water level within the water receiving chamber, the second tilting occurring in a second direction, the second direction being a rotation about the substantially horizontal axis away from the spout and towards the handle of the kettle, the second tilting orienting the kettle past the vertical or returning the kettle to the resting orientation if the normal water level is above the siphon crest.

2. The kettle as claimed in claim 1, wherein the water transfer siphon is preventable from priming for a desired quantity of water within the water receiving chamber of the kettle through a mechanical means for temporarily and substantially obstructing a portion of the water transfer siphon.

3. The kettle as claimed in claim 2, wherein the mechanical means for temporarily and substantially obstructing a portion of the water transfer siphon comprises a gate disposed proximal the siphon inlet aperture or the siphon outlet aperture, the gate being movable by user actuation between an open position allowing flow through the siphon inlet aperture and the siphon outlet aperture and a closed position substantially blocking flow through the siphon inlet aperture and the siphon outlet aperture.

4. The kettle as claimed in claim 2, wherein the mechanical means for temporarily and substantially obstructing a portion of the water transfer siphon comprises a valve arranged proximal to the siphon inlet aperture or the siphon outlet aperture, the valve selectively blocking or unblocking the siphon inlet aperture or the siphon outlet aperture, and
   the valve rotates between an open position allowing flow through the siphon inlet aperture and the siphon outlet aperture and a closed position substantially preventing flow through the siphon outlet aperture, the valve being movable from the open position to the closed position through tilting of the kettle in the first direction.

5. The kettle as claimed in claim 1, wherein the water receiving chamber further comprises a water level marking arranged to measure a water level within the water receiving chamber when the kettle is non-vertical and is at a water charging angle, the water level marking being horizontal when the kettle is non-vertical and is at the water charging angle.

6. The kettle as claimed in claim 5, wherein the water charging angle is an angle between substantially 15 degrees and substantially 30 degrees relative to the vertical with the kettle tilted toward the spout.

7. The kettle as claimed in claim 1, wherein the water receiving chamber is upwardly open except for a coverage provided by a splash guard, and
   the portion of the water receiving chamber not covered by the splash guard forms a water charging aperture through which the water receiving chamber may be charged with water.

8. The kettle as claimed in claim 7, wherein the splash guard is arranged to cover those portions proximal to the handle of the kettle, but not to cover those portions proximal to the spout of the kettle.

9. The kettle as claimed in claim 7, wherein at least a portion of the splash guard is formed of a substantially transparent or translucent material.

10. The kettle as claimed in claim 7, wherein the splash guard is detachable from the water receiving chamber.

11. The kettle as claimed in claim 1, wherein the water transfer siphon includes an assembly of a siphon inner pipe and a siphon outer pipe concentric with the siphon inner pipe,
    a gap between the siphon inner pipe and the siphon outer pipe forms a siphon upwards channel, and
    a passage through the siphon inner pipe forms a siphon downwards channel.

12. The kettle as claimed in claim 1, further comprising a detachable power supply base.

13. The kettle as claimed in claim 12, wherein the water receiving chamber includes a light source adapted to illuminate at least part of the interior of the water receiving chamber, the light source being automatically switchable between an on state when the kettle is separated from the detachable power supply base, and an off state when the kettle is located on the detachable power supply base.

14. A kettle, comprising:
    a spout;
    a handle;
    a water receiving chamber;
    a water heating chamber below the water receiving chamber; and
    a water transfer siphon, the water transfer siphon having
       a siphon inlet aperture in communication with the water receiving chamber, and
       a siphon outlet aperture in communication with the water heating chamber,
    wherein the water transfer siphon is preventable from priming with water from the water receiving chamber by a first tilting of the kettle by a user to increase an elevation of a siphon crest of the water transfer siphon relative to a water level within the water receiving chamber, the first tilting occurring in a first direction,
    the water transfer siphon is primeable with water from the water receiving chamber through a second tilting of the kettle by the user to decrease the elevation of the siphon crest of the water transfer siphon relative to the water level within the water receiving chamber, the second tilting occurring in a second direction, the first direction is a rotation about a substantially horizontal axis towards the spout of the kettle and the second direction is a rotation about the substantially horizontal axis away from the spout and towards the handle of the kettle, and the water receiving chamber further comprises a water receiving chamber bleed aperture formed within the lowermost portions of the water receiving chamber, the water receiving chamber bleed aperture communicating the water receiving chamber to the water heating chamber and being of a lower water transfer rate capacity than the water transfer siphon.

15. The kettle as claimed in claim 14, wherein the water receiving chamber bleed aperture feeds directly into a vertically elongate slot, or is partly formed by a vertically elongate slot.

16. The kettle as claimed in claim 14, wherein the smallest cross sectional area of the water receiving chamber bleed aperture does not exceed substantially 4 square millimeters.

17. The kettle as claimed in claim 14, further comprising a water level marking within the water receiving chamber or on the water receiving chamber, the water level marking indicating a non-horizontal line when the kettle is in a resting position.

18. The kettle as claimed in claim 17, wherein the water level marking is a line that is vertically higher at a position on the line nearer the spout than it is at a position on the line nearer the handle.

19. A kettle, comprising:
a spout;
a handle;
a water receiving chamber;
a water heating chamber below the water receiving chamber;
a water transfer siphon, the water transfer siphon having
a siphon inlet aperture in communication with the water receiving chamber, and
a siphon outlet aperture in communication with the water heating chamber; and
a water level marking within the water receiving chamber or on the water receiving chamber, the water level marking indicating a non-horizontal line when the kettle is in a resting position,
wherein the water transfer siphon is preventable from priming with water from the water receiving chamber by a first tilting of the kettle by a user to increase an elevation of a siphon crest of the water transfer siphon relative to a water level within the water receiving chamber, the first tilting occurring in a first direction,
the water transfer siphon is primeable with water from the water receiving chamber through a second tilting of the kettle by the user to decrease the elevation of the siphon crest of the water transfer siphon relative to the water level within the water receiving chamber, the second tilting occurring in a second direction, and
the first direction is a rotation about a substantially horizontal axis towards the spout of the kettle and the second direction is a rotation about the substantially horizontal axis away from the spout and towards the handle of the kettle.

20. The kettle as claimed in claim 19, wherein the water level marking is a line that is vertically higher at a position on the line nearer the spout than it is at a position on the line nearer the handle.

* * * * *